(12) United States Patent
Fu et al.

(10) Patent No.: US 11,048,375 B2
(45) Date of Patent: Jun. 29, 2021

(54) MULTIMODAL 3D OBJECT INTERACTION SYSTEM

(71) Applicant: ALIBABA GROUP HOLDING LIMITED, Grand Cayman (KY)

(72) Inventors: Paul Fu, San Mateo, CA (US); Xiaohu Dong, San Mateo, CA (US); Rui Yang, San Mateo, CA (US); Chen Zhao, San Mateo, CA (US); Jin Ryong Kim, San Mateo, CA (US); Xiangchao Huang, San Mateo, CA (US); Stephanie Chan, San Mateo, CA (US); Yu Qin, San Mateo, CA (US); Puhe Liang, San Mateo, CA (US); Shenli Yuan, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/231,043

(22) Filed: Dec. 21, 2018

(65) Prior Publication Data

US 2020/0089388 A1   Mar. 19, 2020

Related U.S. Application Data

(60) Provisional application No. 62/733,056, filed on Sep. 18, 2018.

(51) Int. Cl.
*G06F 3/0481* (2013.01)
*G06F 3/01* (2006.01)
*G06F 3/16* (2006.01)

(52) U.S. Cl.
CPC .......... *G06F 3/04815* (2013.01); *G06F 3/013* (2013.01); *G06F 3/016* (2013.01); *G06F 3/017* (2013.01); *G06F 3/167* (2013.01)

(58) Field of Classification Search
CPC ...... G06F 3/04815; G06F 3/013; G06F 3/016; G06F 3/017; G06F 3/167
See application file for complete search history.

(56) References Cited

U.S. PATENT DOCUMENTS

| | | | |
|---|---|---|---|
| 9,477,317 B1* | 10/2016 | Clements | G06F 3/017 |
| 2009/0169058 A1* | 7/2009 | Chen | G06T 7/74 |
| | | | 382/106 |
| 2015/0277700 A1* | 10/2015 | He | G06F 3/04842 |
| | | | 715/852 |
| 2017/0185147 A1* | 6/2017 | Shen | G02B 27/225 |

* cited by examiner

*Primary Examiner* — Seth A Silverman
(74) *Attorney, Agent, or Firm* — Finnegan, Henderson, Farabow, Garrett & Dunner, LLP

(57) ABSTRACT

The present disclosure relates to methods and systems for providing a multimodal 3D object interaction to let the user interact with 3D digital object in a natural and realistic way.

18 Claims, 4 Drawing Sheets

MULTIMODAL 3D OBJECT INTERACTION SYSTEM

CROSS REFERENCE TO RELATED APPLICATION

The disclosure claims the benefits of priority to U.S. Provisional Application No. 62/733,056, filed Sep. 18, 2018, which is incorporated herein by reference in its entirety.

TECHNICAL FIELD

The present disclosure relates to methods and systems for providing a multimodal 3D (3 dimension) object interaction to let the user interact with 3D digital object in a natural and realistic way.

BACKGROUND

As the digital age took off, digital retail such as electronic commerce (e-commerce), online shopping, etc. has been rapidly developed and online shopping becomes one of the most popular way of shopping today. On the other hand, there are still considerable limitations on user experience on products when shopping through the digital platform. In an off-line store, consumers or buyers can fully and naturally interact with physical products to familiarize themselves with the products. Off-line interactions with the products may include looking, touching and trailing, and more. Compared to the off-line shopping, it is difficult for a user to have natural interactions with products in the digital environment beyond simply looking at the products. This has been a big hurdle in developing digital retail business.

It has been recognized that a conventional GUI (Graphical User Interface)-based human-computer interaction system could not provide a user with efficient natural interactions with the products in digital environment. That is, the GUI-based technology cannot bring a natural and deep interactive experience close to reality for consumers under the digital platform of online shopping or digital retail. However, it is important to provide customers with natural and deep interactions with products while it is inefficient to display various physical products in offline stores in view of space and cost. Therefore, there is a huge demand for a technology supporting user's organic and efficient interaction with digital objects in retail business scenes including various commodity exhibitions as if the user tests the products in the offline store.

SUMMARY

The present disclosure relates to methods and systems for providing a multimodal 3D object interaction to let the user interact with 3D digital object in a natural and realistic way.

Consistent with some disclosed embodiments, a 3D object interaction system is disclosed. The system comprises a 3D displayer configured to display at least one object in a 3 dimension (3D) view; an eye tracker configured to track a position and an angle of a user's eye; a motion sensor configured to track a user's movement in mid-air; and a computing device having circuitry to: determine whether the user's movement matches a predetermined gesture interaction; cause a feedback provider to generate at least one feedback according to the predetermined interaction when the user's movement matches the predetermined gesture interaction; and cause the 3D displayer to adjust the object displayed on the 3D displayer according to the position and angle of the user's eye or when the user's movement matches the predetermined gesture interaction. The 3D displayer is a 3D naked eye displayer. The feedback includes ultrasound haptic feedback, visual feedback, or audio feedback. The computing device includes a multimodal interaction engine configured to perform 3D display rendering, feedback rendering, or gesture recognition and analysis. The tracked user's movement involves the user's hand or fingers.

Consistent with some disclosed embodiments, a 3D object interaction method is provided.

Consistent with some disclosed embodiments, a computer-readable storage medium comprises a set of instructions executable by at least one processor to perform the 3D object interaction method is provided.

Consistent with other disclosed embodiments, a non-transitory computer readable storage media may store program instructions, which are executed by at least one processing device and perform the aforementioned the 3D object interaction method described herein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention.

The disclosed embodiments provide 3D (3 dimension) object interaction system and method. The disclosed embodiments can resolve the limitations of merchandise display and interaction based on conventional e-commerce platform. In the conventional e-commerce platform, the major display mode includes an image display, video show and product specification display, etc., the interaction mode generally relies on traditional WIMP (Windows, Icons, Menu and pointing device) elements, and the operation mode is limited to view the product in detail by selecting the product. The disclosed embodiments provide efficient user perception and interaction to the product at least through integrating various technologies for 3D display, gesture interaction, and multimodal interactive feedback. The disclosed embodiments can reduce the psychological distance between users and digital products and provide a novel natural interaction modal which can be used in digital retail.

Figure 1:
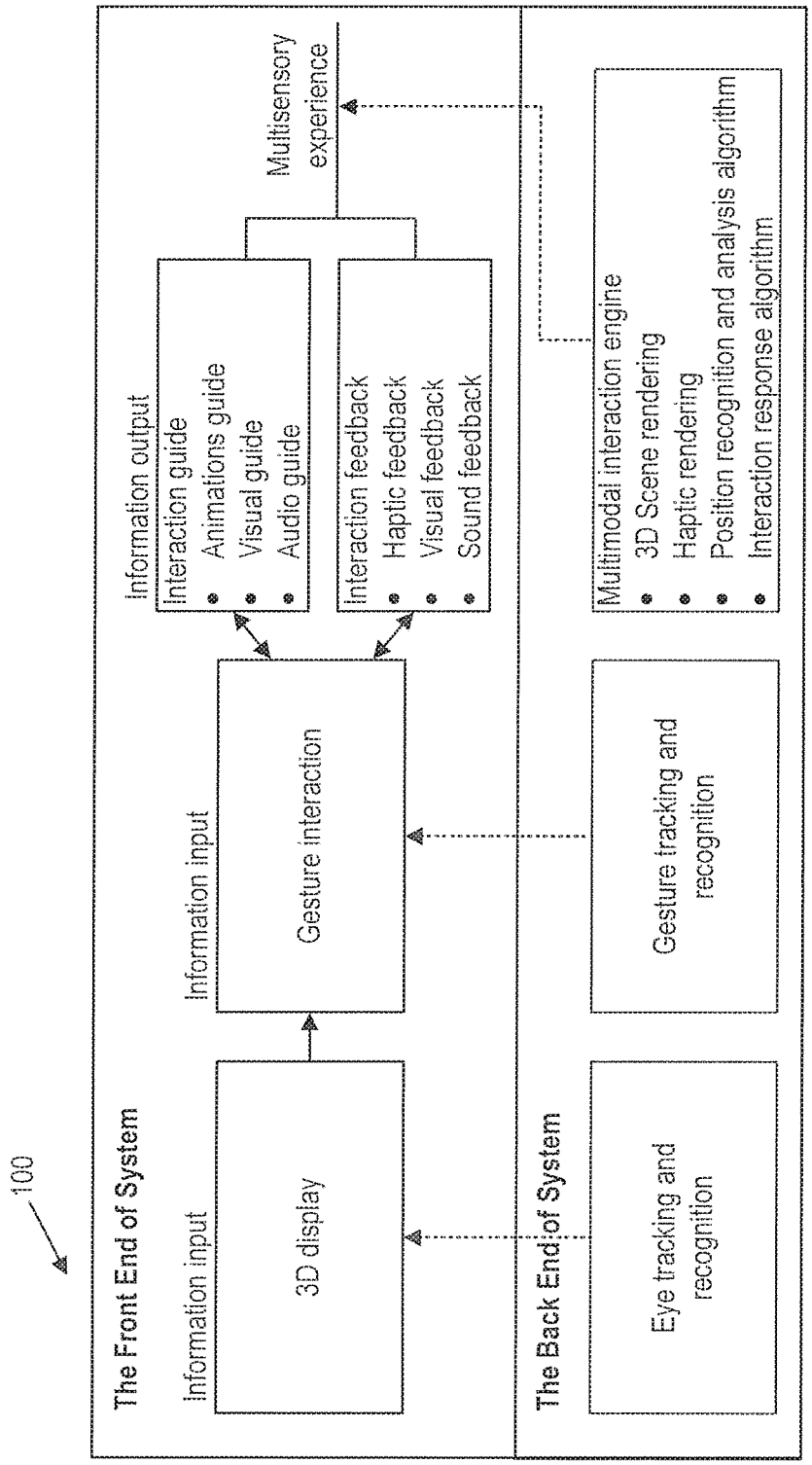
FIG. 1 illustrates an exemplary framework of 3D object interaction system, consistent with embodiments of the present disclosure.
Figure 2:
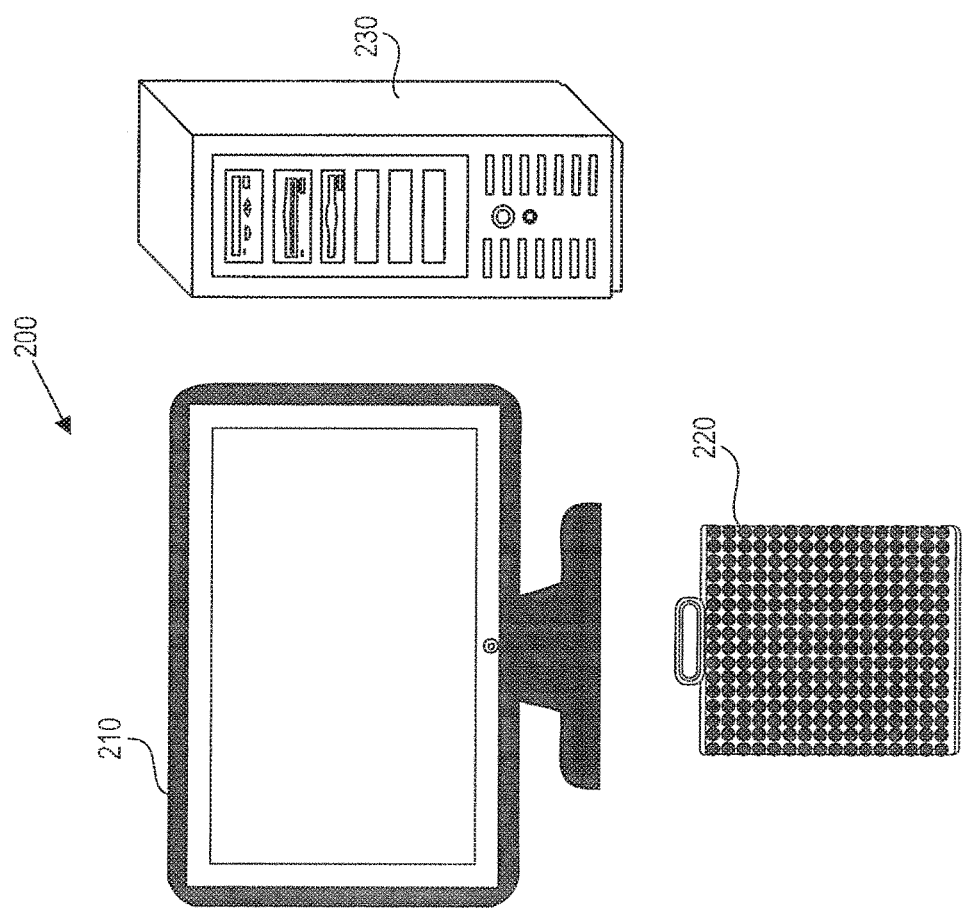
FIG. 2 illustrates an exemplary hardware configuration for the 3D object interaction system of FIG. 1, consistent with embodiments of the present disclosure.

FIG. 1 illustrates an exemplary framework of 3D object interaction system 100, consistent with embodiments of the present disclosure. FIG. 2 illustrates an exemplary hardware configuration 200 for the 3D object interaction system 100 of FIG. 1, consistent with embodiments of the present disclosure. As shown in FIG. 2, the hardware configuration 200 for the 3D object interaction system 100 may include 3D displayer 210, one or more motion sensors 220, and computing device 230. The 3D object interaction system 100 may further include an eye tracker, which can be incorporated in the 3D displayer 210. The 3D object interaction system 100 may further include feedback provider, one of which can be incorporated in motion sensor 220 and provide ultra-haptic feedback in mid-air. The computing device 230 may include one or more processors and one or more memories for implementing at least part of the back-end of the system 100.

The disclosed embodiments allow potential retail buyers and end consumers deep and natural interaction with digital goods by integrating different interaction modalities into the 3D object interaction system. The disclosed embodiments support the 3D display of digital goods and retail virtual scenes, natural gesture interactions and multi-sensory interactive feedback. The embodiments will be described referring to FIGS. 1 and 2.

3D displayer 210 displays 3D objects, consistent with embodiments of the present disclosure. Users can interact with 3D digital objects displayed on the 3D displayer 210. The system 100 may use a 3D naked-eye displayer, which enables a user to see brilliant three-dimensional images in a natural way without any additional eyewear while at the same time he/she enjoys freedom of movement in front of the display. 3D content generation can be obtained using two kinds of technology, one is to use the image conversion technology to convert 2D images into 3D images, and the other is to build 3D contents based on 3D model building software. The system 100 may use a cross-platform development tool to develop 3D/2D interactive system such as 3D gaming development, to develop 3D interactive usage scenarios, and the 3D scenes can be presented through the 3D naked eye displayer 210. The system 100 of the disclosed embodiments utilizes 3D naked eye display technology that enables users to see natural and brilliant three-dimensional images without any additional components such as 3D eyewear or virtual sets.

The disclosed embodiments allow users to interact with digital object displayed on the 3D displayer 210. Based on the general interaction logic with digital objects, the system 100 may customize a gesture interaction modal for retail business scenes. Gesture interactions that match natural interactions expected by users can be used. For example, objects browse may be performed by swiping left/right on a rotating disk, and object selection may be performed by touching a target object in mid-air. Also, the object browsing and selection can be performed by eye tracking and recognition. For example, the user can scan the objects in the 3D scene and the system 100 provides feedback(s) where the user is looking at. When the user reaches a target object, the system 100 notifies the user that the target object is selected and is ready for exploration. After that, the user can make a hand gesture to pull out the target object in front of the user. Interaction with the selected single object may include grasping the object, zooming in and out with multi-finger pinch, and holding and wrist rotation to rotate the object. Object switch to a next object may be performed by hand sliding to left/right. By pushing the object back may trigger the overall navigation mode of the 3D scene. More gesture interactions may be used for interacting with digital objects displayed through 3D displayer 210 according to the embodiments.

The system 100 of the disclosed embodiments utilizes gesture-based interaction that is a human-centric form of interaction wherein the user does not touch a display but interacts with it by performing bodily gestures to interact and communicate with a digital system. A gesture in this context is an intended movement of body parts (hands/eyes or other parts) to achieve communication.

The disclosed embodiments provide multi-channel sensory feedback in the process of interacting with 3D scenes or objects. Tactile feedback can be used. The use may receive the tactile feedback in mid-air. As mentioned above, the system 100 can user gesture interactions as one of the interaction modes. The user can make the gestures to interact with the 3D object in mid-air without physically contacting other interfaces. The existing gesture interaction solution mainly relies on visual feedback for the user to know whether their gestures are successful or not. Therefore, the user cannot take her/his eyes off the screen in the existing gesture interaction solution, and thus it limits user's activity while interacting with digital goods and affects user experience. The system 100 may use ultrasound haptic feedback which can provide mid-air feedback and thus make the tactile feedback separated from other interfaces. Ultrasound sensation feedback allows the user to feel intuitive operation feedback without the need of keeping the eyes on the screen, and it also brings more realistic feeling for the user to sense the digital objects directly. With ultra-haptic feedback, each finger or hand involved in the gesture interaction can get individual feedback, which gives the user a better sense of control and enables various gesture motions. The system 100 of the disclosed embodiments utilizes mid-air tactile simulation enabling users to experience the physical properties of digital objects through mid-air tactile feedback. Technologies to provide mid-air tactile simulation may include ultrasound feedback, air pulse generated tactile sensation, and the tactile display created by laser.

Mid-air tactile feedback can be provided according to the users' motions to simulate the physical tactile sensation or provide interactive feedback. For example, when a user touches a target object or other objects the user can get mid-air haptic feedback at the very moment of touching. The user may feel the unique texture, feature, or quality of the object through the mid-air tactile feedback. Ultra-haptic feedback enables the user to feel some invisible qualities of the object, such as airflow of a purifier, water splash inside a drum type washer, air bubbles produced by washing powder, etc. The ultra-haptic feedback also provides interactive feedback. For example, when two-finger pinch is used to zoom in/out of an object, a focal point is created for each of two fingers and the difference in modulation frequency between the two focal points increases as the two focal points move apart, therefore the user can sense ultra-haptic feedback for each finger. When there is a rotation widget to display objects, a user can have ultra-haptic feedback for the user to know whether it is a right direction when rotating the widget.

The system 100 of the disclosed embodiments can provide other feedbacks such as visual feedback, sound feedback, other types of haptic feedback, etc. for specific scenarios to enhance user experience as well as the above described tactile feedback. For example, after completing the gesture input, users can experience the sound feedback timely, the user can have satisfaction more in depth experience of achieving the task.

Figure 3:
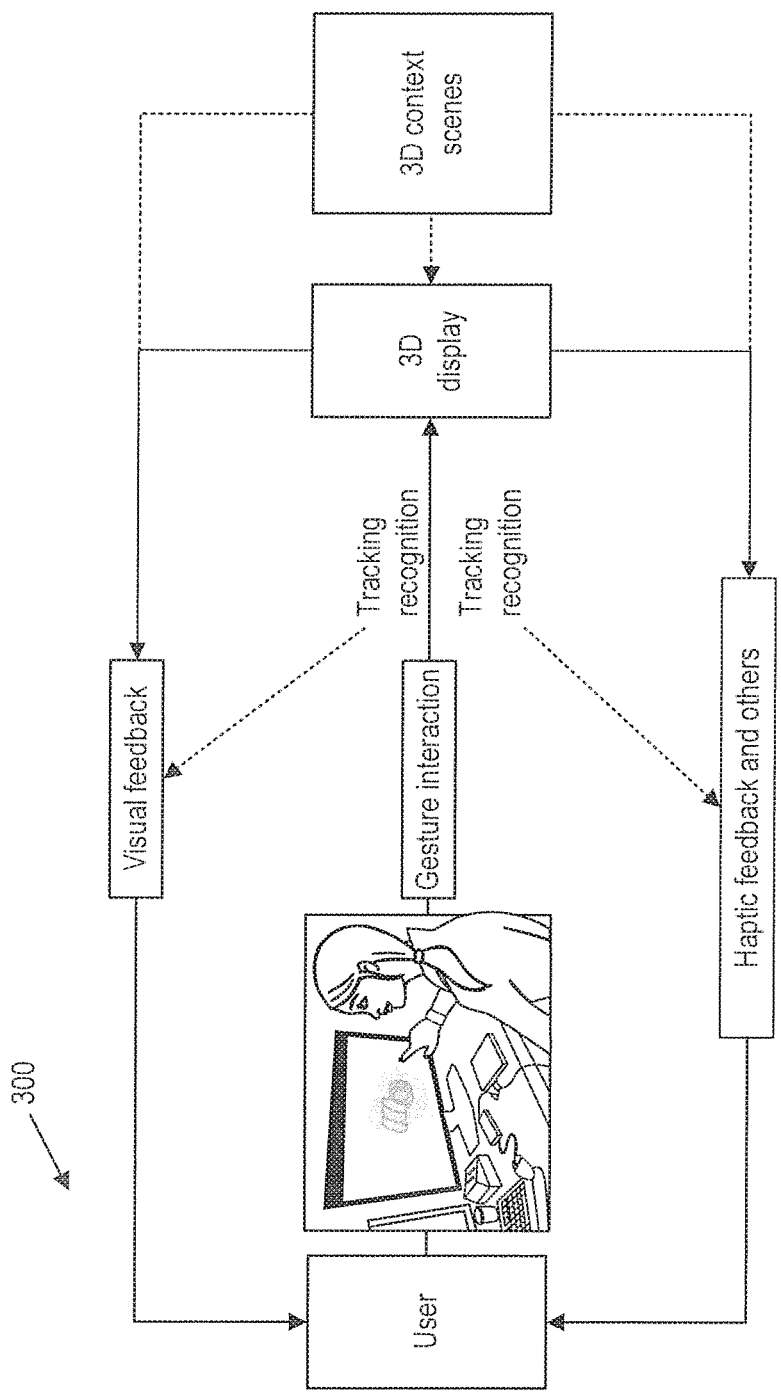
FIG. 3 illustrates an exemplary operation flow of the 3D object interaction system of FIG. 1, consistent with embodiments of the present disclosure.

FIG. 3 illustrates an exemplary operation flow 300 of the 3D object interaction system of FIG. 1, consistent with embodiments of the present disclosure. The disclosed embodiments allow users to interact with the system in a time range. The overall interactive experience may consist of three phases.

When the system 100 does not detect anyone in the system's perception range, the system is in a wait state. After a camera of the system 100 detects a human eye, the system 100 recognizes that a user is within a set interaction range and perceives that the user is looking at the display. The camera may be incorporated into the 3D displayer 210. To ensure that the user enters the preferable interaction range, the system 100 may provide the user with a guide. The user interacts with the system 100 in a certain area so that the camera and motion sensor 220 can capture the user's eye movement and gestures properly. The guide may include animation guide, visual guide, audio guide, etc. For example, the system 100 may provide an animation guide with audio to advise the user to approach the system 100 and interact with it. The system 100 may provide a text guide with sound to help the user move closer to the preferable range and use the system. If the user is too close to the system 100, the system may provide a message such as "it's too close."

When the user is in the optimal interactive area of the interaction range and starts the interaction based on the animation guidance, the 3D displayer 210 switches to a main scene of the 3D object display. In this scene, the user may see multiple objects displayed in a horizontal rotating carousel. The carousel intuitively reminds the user to rotate it to navigate to a target object by hand/finger sliding left or right. When the user locates the target object and touches the object by hand/finger, the object stops rotating and is zoomed in. The object may be within a transparent container. The user taps the transparent container and the container may disappear. The selected object is presented to the user in an optimal size floating in the mid-air. The user enters a deep interact state with a digital object. In this stage, the user can grasp the object, zoom in and out, and rotate it. In this series of gesture interactions, the system 100 may provide a real-time feedback to the user. For example, haptic feedback, visual feedback, sound feedback, and a combination of at least two of the three feedbacks can be provided to enhance the immersive experience of the user. According to some embodiments, other types of feedback such as olfactory feedback can also be provided.

After the user completes the interactive loop of the target object, the system 100 may prompt the user whether the user wants to return to the main scene, and the system 100 indicates the corresponding gesture interaction mode. The system 100 may allow the user to return to the main scene in two ways: 1) Push the object back in the depth direction, then the display of the 3D displayer 210 returns to the main scene; 2) or the system 100 automatically returns to the main scene if the system detects that the user has not performed the gesture interaction for a predetermined period. For example, the system 100 automatically returns to the main scene if the system recognizes that the user has not interacted with the system for more than 15 seconds.

While the user interacts with the system 100, gesture recognition and motion analysis are processed in the system 100 to ensure smooth and natural interaction. At the same time, real-time 3D images can be provided through eye tracking and recognition. The binocular eye tracking may be used in the embodiments.

The system 100 may ensure that the interactive process ends in an elegant way. It is preferable that the user interaction is not abruptly terminated. In an exemplary implementation, when the system 100 detects that the user has stopped the gesture interaction for a predetermined period, the system determines that the user has stopped interaction, and the system may automatically reset its state and switches the scene mode to the initial animation state. For example, the predetermined period may be set as 40 seconds.

In some embodiments, a user may stop interaction after she/he has full experience with all the 3D scenes. In this case, the system may show a message with sound, such as "Thank for your visit, please leave your feedback to us" to the user. There are cases that users only try a part of the interaction and want to leave early. In some implementations, when encountering such cases that the system 100 detects that the user just completes a part of scenes without further action, the 3D displayer 210 may have a message such as "Would you like to try next scene? it will be more amazing!" to keep the user. Otherwise, the 3D displayer 210 may switch to the initial mode if the system 100 determines that the user has left.

Referring FIG. 1, the back-end of the system 100 will be described in detail. In order for the system 100 to operate in a way described as above, the system 100 may perform eye-tracking and recognition, gesture tracking and recognition, and multi-modal interaction process. To ensure user experience and satisfaction, the back-end technology implementation focus on realizing smooth and efficient gesture interaction, robust 3D display, error tolerance, and error recovery. Each of them helps a natural and smooth interactive experience of the front-end of the system 100.

Eye tracking and recognition is important to ensure the user sees the 3D object as if the object is in real. The disclosed embodiments utilize the camera of the binocular position capture to track the position of user's eyeball and adjust the 3D image in real time according to the change of the user's viewing angle and distance. The camera may be provided by the 3D naked eye displayer. In a conventional 3D display system, when the user's viewing angle changes, the 3D digital scene which the user sees does not change accordingly, and the user cannot see different angles of the 3D object; when the viewing distance changes, the change of the depth of field is also inconsistent with the reality. For example, if the user moves from a distance of 0.4 meters from the screen to a distance of 0.5 meters, a virtual 3D object that was originally at a position of 0.1 meters from the screen will move to a position of 0.15 meters. It can significantly reduce the realism of 3D display when the perceived experience is inconsistent with the reality.

In the exemplary embodiments, the system 100 associates the camera positions of the scenes with the position of the user's head, when the system 100 detects the real-time adjustment of the user's head position, the position and angles of the 3D object displayed on the 3D displayer 210 will also change accordingly. It simulates the way that the human eyes see the physical objects in the real world and brings more realistic 3D experience.

In the disclosed embodiments, user's smooth interaction with virtual scenes can be obtained based on continuous gesture recognition and analysis. At the same time, gesture tracking and recognition may also be used to trigger mid-air tactile feedback in some scenarios. For example, when a virtual product is seen as hovering outside the screen, a user can rotate the virtual product by hand/finger. When the user's hand moves to a position where the virtual object is perceived in the real world, the system 100 notifies the feedback provider such as the ultrasonic haptic feedback provider to generate haptic feedback at the location of the user's hand, causing the user to feel the tactile sensation of touching the real object. The back-end software coordinates the spatial coordinate system of the 3D scene, the gesture recognition system, and the ultrasonic haptic system so that user's spatial perception of the 3D object becomes closer to reality. Motion sensor 220 generally realizes the tracking and recognition of the hand's position. On the other hand, accurate identification and analysis of specific hand gestures is one of the important tasks that the back-end software implements. The gesture is continuous rather than discrete and there has been a fundamental tension between continuous-gesture recognition and discrete-gesture recognition in a conventional gesture-recognition technology. The back-end algorithm used for gesture recognition and analysis of the disclosed embodiments focuses on improving the ability to recognize the intent of the user with gesture communication while ensuring that the system 100 has sufficient fault tolerance. The back-end algorithm may consider physical traits of a user's gesture and a specific scene where the gesture is made. For the physical traits of a user's gesture, a speed, direction and position of a user's hand or finger can be determined. When a specific scene such as a product selection is in consideration, the algorithm can exclude some gesture recognitions that are not applied to the scene.

The system 100 includes a multi-modal interaction engine to ensure the system 100 provides a natural and smooth user experience with the 3D object. Through the multi-modal interaction engine, the high resolution of 3D scene real-time rendering, high-accuracy recognition of gestures, smooth interaction of gestures, and real-time feedback response can be obtained. The multi-modal interaction engine in the back-end may include 3D real-time rendering, parsing and rendering engine, and the physics engine that simulates real world gesture interaction and real-time response involving gesture recognition, contact detection, real-time multi-modal feedback.

The system 100 utilizes multimodal interaction, which is a multimodal human-computer interaction referring to interaction with computer system in a more natural communication mode. The goal of the multimodal interaction is to bring a more free, flexible, and natural communication between human and computer to improve overall digital experience and communication efficiency. Beyond the conventional GUI interaction, multimodal systems allow users to interact with physical or digital environment through multi input modalities, such as voice, hand gesture and body gesture, handwriting, and to receive information through different output modalities, such as 3D visual display, tactile feedback, force feedback, audio response and other modalities.

In general, the multimodal interaction engine performs the organic integration of multimodal interactions to create a new, more natural and humanized human-computer interaction model that is suitable for digital retail business scenes. The dialogue between the user and the system provides a positive experience for a user to understand the system and to feel satisfaction, pleasure, and fun.

To enhance the overall experience of user interaction with digital goods, a 3D digital naked eye display, a natural gesture interaction, and multiple sensory feedback methods can be combined through effective technology, consistent with embodiments of the present disclosure. Back-end technology can provide true-to-life 3D presentations, support natural and smooth gesture communication, and enhance the overall experience with real-time responses. When the gesture is recognized, the system 100 can provide a clear response through multi-sensory feedback including tactile feedback, audible feedback, and visual feedback.

It is important to establish gesture interaction languages that can be applied to the 3D object interaction system 100, consistent with embodiments of the present disclosure since the conventional GUI interaction modal based on conventional desktop computer system or mobile system cannot be applied to the system 100. To provide a natural and immersive experience with the 3D product of the disclosed embodiments, more gesture interactions or interactive language definitions can be used than in the conventional GUI based interaction modal, according to some embodiments of the present disclosure. The disclosed embodiments provide a set of gesture interaction languages for users to interact with digital goods. For example, the gesture interaction languages can be interpreted in the perspective of the digital retail business. In some embodiments, the set of gesture interaction languages can be set to implement natural and immersive user experience in 3D scenes by observing physical user interaction with an object in the real world. For example, the set of gesture interaction languages can be defined by considering a user's gesture behavior in the real world and potential gesture perception, and then be confirmed through an iterated user evaluation. The gesture interaction languages may include the definition of gesture-based actions based on specific tasks and corresponding system feedback.

Figure 4:
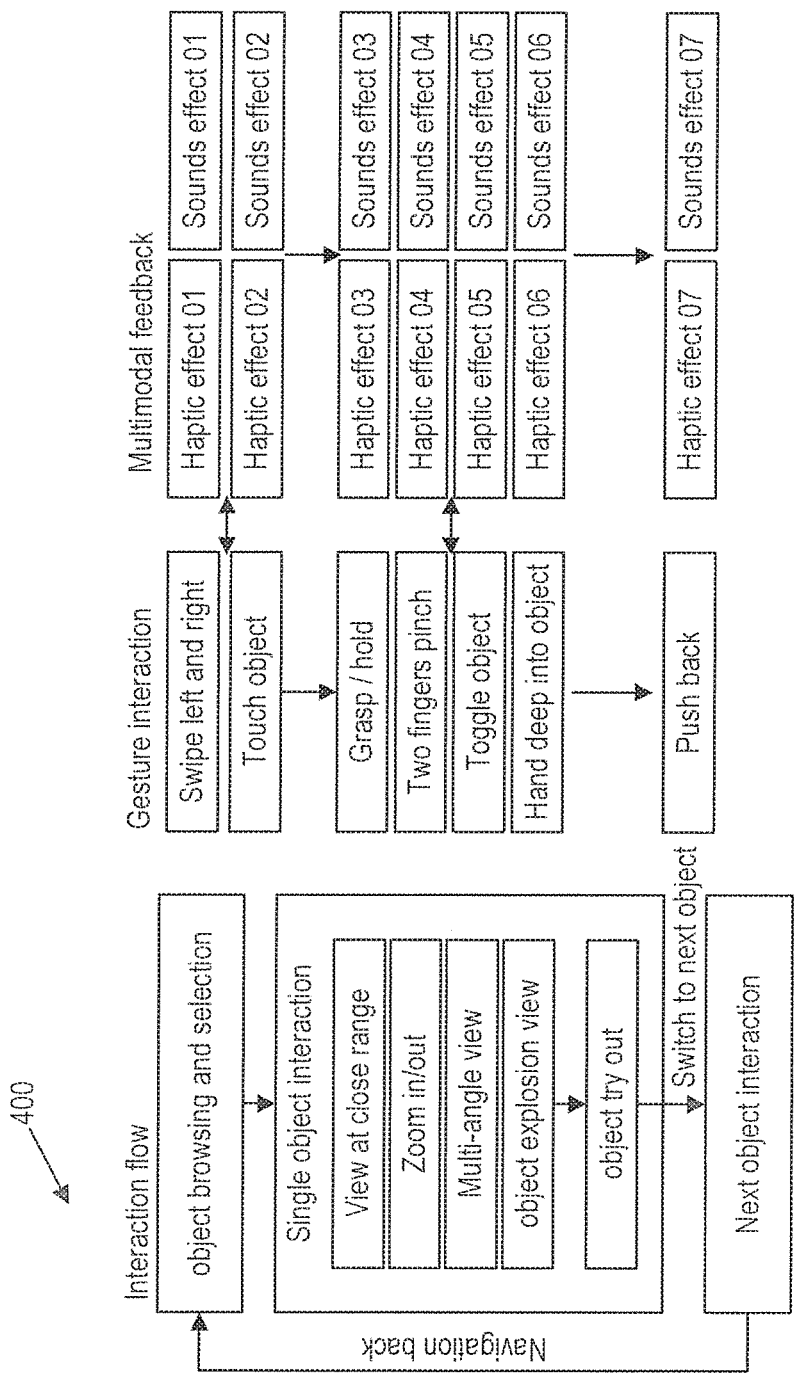
FIG. 4 illustrates an example of interaction patterns for the 3D object interaction system of FIG. 1, consistent with embodiments of the present disclosure.

FIG. 4 illustrates an example of interaction patterns 400 for the 3D object interaction system of FIG. 1, consistent with embodiments of the present disclosure. For example, the object browsing and selection in the interaction flow can be performed by swiping hand/finger left or right and touching a target object. If actions are recognized by the system 100, the system 100 provides feedback(s) to a user for each action. Similarly, each action to the single target object in the interaction flow column is performed by a corresponding gesture interaction in the gesture interaction column and corresponding feedbacks can be provided. After the user completes exploration with the selected object, the user can push the object backward (e.g., using motion sensor 220) to put the object in the original place in the 3D scene. Now the user may start next object interaction from the beginning to switch an object to explore. Although FIG. 4 shows haptic effect and sounds effect, the embodiments may provide less or more feedbacks than two or other combinations of feedback according to some embodiments of the present disclosure. Although FIG. 4 shows a certain gesture interaction corresponding to a specific action, the specific action can be performed by other gesture interaction according to some embodiments of the present disclosure. Although FIG. 4 does not show corresponding gesture interaction for the single object try out, it is to be understood that the gesture interactions for the object try out can be specifically set to the object. For example, the gesture interactions can be set to test functions of the object.

It is appreciated that the system 100 may be applied in all kinds of exhibition of business-to-business (B2B) commodity display, such as all kinds of sales meeting. The disclosed embodiments provide a new way of interacting with digital merchandise for buyers to have a better understanding of the merchandise. The disclosed embodiments may also be applied into various retail business scenes, providing a unique experience for consumers to naturally interact with digital products offline.

The disclosed embodiments support 3D digital product presentation, allowing users to have the experience to see a digital product, which is similar to the experience we see the physical object in real world. At the same time, through natural gesture interaction combined with multi-dimensional interactive feedback (including tactile feedback, sound feedback, and visual feedback) to support users more natural and three-dimensional digital product interaction, allowing users to experience and understand the product better. The interaction model of the present disclosure includes entity display of digital products and scenes, customized gesture interaction mode, and multi-dimensional operation feedback.

The disclosed embodiments innovatively integrate leading technologies (3D naked eye display, gesture interaction and mid-air haptic feedback) into the business scene of digital commerce. The multi-modal interaction framework of the present disclosure is suitable for various application scenarios in digital retail. At the same time, the framework of multimodal interactive system is modal-based and open. Other interaction modalities can be added into the system based on the needs of business scenes and user experience, consistent with embodiments of the present disclosure.

The disclosed embodiments develop a customized natural interaction modal tailored well for a user to interact with the digital products and the 3D retail scenes. The modal provides a closed loop system for digital interaction, which has three links: 3D commodity display, customized gesture-driven interaction pattern and unique multisensory feedback. The modal may be defined for digital retail scenes and matched with overall shopping interaction flow well. It is appreciated that such solution has not been found in the industry.

The present embodiments provide a solution to the user experience issue of the conventional 3D display monitor and make the 3D display experience close to offline experience when human eyes see the physical objects in real. When users see 3D objects through conventional 3D display monitor, the typical issue is the virtual scene that the users view does not change accordingly when the user see the scenes in a different angle or in a different distance. It is inconsistent with the experience the users view the real physical world. The back-end solution of the present disclosure eliminates these inconsistencies by binding digital camera's position with user's head position and allowing virtual scenes can be dynamically changed based on the changing position of user's head. It provides huge improvement on the realism of 3D naked eye display.

The present embodiments apply ultrasonic mid-air feedback technology into the retail experience. It is noted that mid-air ultrasound feedback enables to express some invisible features and quality of commercial products, such as airflow of a purifier and electronic fan. It is appreciated that users have had difficulty to sense these kinds of invisible qualities of products from a conventional product marketing display way. The present embodiments also use the ultra-haptic feedback into the gesture interaction scenarios for a user to experience interaction feedback intuitively. The present embodiments give users a unique interaction experience and strengthen the psychological connection between the users and products.

Since the conventional 3D merchandise display system has been limited to the interactive modal with typical desktop computer, the conventional 3D merchandise display system cannot support users to interact with products in more immersive way and cannot support rich interactive feedback while communicating with the 3D objects. The disclosed embodiments focus on improving a natural interaction experience for a user to interact with 3D objects. The disclosed embodiments develop a set of natural gesture interaction languages as the communication inputs for user to interact with 3D scenes in natural way, thereby overcoming the limitations of conventional GUI interaction method in which a user mainly interacts with 3D merchandise based on a conventional mouse or keyboard. Also, the disclosed embodiments develop the multimodal interaction feedback. When users interact with 3D scenes, they can have real-time tactile feedback, visual feedback and audible feedback. It brings a more natural and realistic digital interactive experience.

There has been a virtual fitting mirrors system in which a user tries a garment in front of the mirror and the user sees a simulated mannequin onscreen with a shape resembling a user's body. Although the virtual fitting mirror supports the user to interact with the screen through gestures, etc., the interaction is so limited that the user couldn't interact with the simulated representation sufficiently. For example, the virtual fitting mirrors system could not bring multiple and intuitive sensory feedback to a user as in the system of the disclosed embodiments. The disclosed embodiments provide a common natural interaction system that can be used in various potential new retail business scenes while the conventional virtual fitting mirrors system can be applied to very small area. That is, the disclosed embodiments provide a universal mode of interaction with digital goods, which can be more widely used than the virtual fitting mirror. On the other hand, the virtual fitting mirror only provides the visual display and lacks intuitive and diverse sensory feedback, and the overall experience is far less than in the system of the disclosed embodiments.

The disclosed embodiments provide a system and a method of multimodal 3D product display and interaction to let the user interact with 3D digital product in a more natural and immersive manner. The input and output sections of the multi-modal interactive system described above can integrate with different technical components, consistent with the present disclosure. In terms of information input, in addition to gesture interaction, voice input can be integrated as an auxiliary information input mode to ensure that the entire system can meet more complex scenarios. For example, gesture interactions can focus on inputting common interactive commands, while voice input can be used to input more precise and complex commands.

For technical solutions for gesture tracking, the system 100 may adopt various types of motion sensors, consistent with embodiments of the present disclosure. For example, a gesture recognition technology supporting tracking of the entire human body or multi-person tracking in addition to hands tracking can be used. The system 100 may adopt various types of eye tracking technologies, consistent with embodiments of the present disclosure. For example, an eye tracking technology allowing a user to interact with the 3D digital retail scenes by his/her eyes directly can be used. The system 100 may adopt various types of mid-air tactile feedback technologies, consistent with embodiments of the present disclosure. For example, air pulses generation directed by an actuated flexible nozzle can be used to provide tactile sensation. Laser tactile solution can be used in that the laser travels longer distance with little diffusion and attenuation and thus could create a larger workspace of tactile display.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a hardware processor core of a computer, other programmable data processing apparatus, or other devices to function in a particular manner, such that the instructions stored in the computer readable medium form an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM, EEPROM or Flash memory), an optical fiber, a cloud storage, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is to be understood that the disclosure is not limited to the arrangements of the components set forth in the description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, it is appreciated that the conception and features upon which this disclosure is based may readily be used as a basis for designing other methods and systems for carrying out the several purposes of the present disclosure. Furthermore, the claims should be regarded as including such equivalent constructions insofar as they do not depart from the spirit and scope of the present disclosure.

The invention claimed is:

1. A 3D object interaction system comprising:
a computing device having circuitry to perform:
  causing to display at least one 3 dimensional (3D) object in a (3D) view on a displayer;
  tracking a position and an angle of a user's eye;
  tracking a user's movement in mid-air;
  determining whether the user's movement matches a predetermined gesture interaction;
  causing a feedback provider to generate at least one feedback according to the predetermined gesture interaction when the user's movement matches the predetermined gesture interaction; and
  causing the displayer to adjust the 3D object displayed on the displayer according to the tracked position and the tracked angle of the user's eye or when the user's movement matches the predetermined gesture interaction,
wherein causing the displayer to adjust the 3D object displayed on the displayer comprises causing the displayer to change a position of the displayed 3D object in a depth direction in real time when the user's eye moves closer to or farther from the displayer and to display a different angle of the displayed 3D object according to the tracked position and the tracked angle of the user's eye.

2. The system of claim 1, wherein the displayer is a 3D naked eye displayer.

3. The system of claim 1, wherein the feedback includes ultrasound haptic feedback, visual feedback, or audio feedback.

4. The system of claim 1, wherein the computing device includes a multimodal interaction engine configured to perform 3D display rendering, feedback rendering, or gesture recognition and analysis.

5. The system of claim 1, wherein the tracked user's movement involves the user's hand or fingers' movement.

6. The system of claim 1, wherein the feedback provider generates mid-air haptic feedback.

7. The system of claim 6, wherein the mid-air haptic feedback corresponds to a textural quality of the 3D object or invisible quality of the 3D object.

8. A 3D object interaction method comprising:
- displaying at least one 3 dimensional (3D) object in a 3D view on a displayer;
- tracking a position and an angle of a user's eye and a user's movement in mid-air;
- determining whether the user's movement matches a predetermined gesture interaction;
- generating at least one feedback according to the predetermined gesture interaction when the user's movement matches the predetermined gesture interaction; and
- adjusting the 3D object displayed on the displayer according to the tracked position and the tracked angle of the user's eye or when the user's movement matches the predetermined gesture interaction,
- wherein adjusting the 3D object displayed on the displayer comprises changing a position of the displayed 3D object in a depth direction in real time when the user's eye moves closer to or farther from the displayer and displaying a different angle of the displayed 3D object according to the tracked position and the tracked angle of the user's eye.

9. The method of claim 8, wherein adjusting the 3D object displayed on the displayer comprises:
- floating in mid-air one object among the at least one 3D object when it is determined that the one object is selected by the user according to the tracked position and the tracked angle of the user's eye or the user's movement.

10. The method of claim 8, wherein determining whether the user's movement matches a predetermined gesture interaction is performed by considering physical traits of a user's gesture and a scene where the gesture is made.

11. The method of claim 8, wherein the displayer is a 3D naked eye displayer.

12. The method of claim 8, wherein the tracked user's movement involves the user's hand or fingers' movement.

13. The method of claim 8, wherein the feedback includes mid-air haptic feedback.

14. The method of claim 13, wherein the mid-air haptic feedback corresponds to a textural quality of the 3D object or invisible quality of the 3D object.

15. A non-transitory computer readable medium that stores a set of instructions that is executable by at least one processor of a computing device to cause the computing device to perform a 3D object interaction method, the method comprising:
- determining whether a user's movement in mid-air matches a predetermined gesture interaction;
- causing a feedback provider to generate at least one feedback according to the predetermined gesture interaction when the user's movement matches the predetermined gesture interaction; and
- causing a displayer to adjust at least one 3D object displayed on the displayer according to a position and an angle of a user's eye or when the user's movement matches the predetermined gesture interaction,
- wherein the user's movement is recognized based on user's movement tracking information and the position and the angle of the user's eye is recognized based on user's eye tracking information, and
- wherein causing a displayer to adjust at least one 3D object displayed on the displayer comprises causing the displayer to change a position of the displayed 3D object in a depth direction in real time when the user's eye moves closer to or farther from the displayer and to display a different angle of the displayed 3D object according to the tracked position and the tracked angle of the user's eye.

16. The computer readable medium of claim 15, wherein causing a displayer to adjust at least one 3D object displayed on the displayer comprises:
- causing the displayer to float in mid-air one object among the at least one 3D object when it is determined that the one object is selected by the user according to the tracked position and the tracked angle of the user's eye or the user's movement.

17. The computer readable medium of claim 15, wherein determining whether the user's movement matches a predetermined gesture interaction is performed by considering physical traits of a user's gesture and a scene where the gesture is made.

18. The computer readable medium of claim 15, wherein the displayer is a 3D naked eye displayer.

* * * * *